(12) United States Patent
Wong et al.

(10) Patent No.: US 7,739,352 B2
(45) Date of Patent: Jun. 15, 2010

(54) SYSTEM AND METHOD FOR FACILITATING A CONSISTENT POINT-IN TIME COPY

(75) Inventors: Brian L. Wong, Gordonsville, VA (US); David Robinson, Austin, TX (US); Richard J. McDougall, Menlo Park, CA (US); Spencer Shepler, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 1241 days.

(21) Appl. No.: 10/831,096

(22) Filed: Apr. 23, 2004

(65) Prior Publication Data

US 2005/0240632 A1    Oct. 27, 2005

(51) Int. Cl.
G06F 15/16    (2006.01)
G06F 12/00    (2006.01)

(52) U.S. Cl. .................................. 709/217; 707/201
(58) Field of Classification Search .................. 709/217; 711/162
See application file for complete search history.

(56) References Cited

U.S. PATENT DOCUMENTS

| 6,212,531 | B1 | 4/2001 | Blea et al. |
| 6,618,794 | B1 | 9/2003 | Sicola et al. |
| 6,826,666 | B2 * | 11/2004 | Berkowitz et al. .......... 711/162 |
| 7,133,884 | B1 * | 11/2006 | Murley et al. ................ 707/202 |
| 7,165,155 | B1 * | 1/2007 | Duprey et al. ............... 711/162 |
| 7,243,198 | B2 * | 7/2007 | Berkowitz et al. .......... 711/162 |
| 2003/0159007 | A1 | 8/2003 | Sawdon et al. |
| 2003/0182526 | A1 * | 9/2003 | Mikkelsen et al. .......... 711/162 |
| 2003/0212870 | A1 | 11/2003 | Nowakowski |
| 2003/0236956 | A1 | 12/2003 | Grubbs et al. |

* cited by examiner

Primary Examiner—Shawki S Ismail
Assistant Examiner—Esther Benoit
(74) Attorney, Agent, or Firm—Park, Vaughan & Fleming LLP

(57) ABSTRACT

A system and method for facilitating a consistent point-in-time copy (PITC). A data provider offers access to data by one or more clients. A client issues a PITC request for a set of data to the data provider, or the provider initiates its own request. The data provider instructs one or more clients, particularly clients accessing the set of data, to flush any pending updates involving the files. The clients acknowledge the flush request, flush their data, and notify the data provider when their flushes are complete. Post-consistency updates are deferred (e.g., using a write-aside buffer). If a client fails to acknowledge the flush request or notify of flush completion, the data provider may abort the PITC or continue because the data may not be consistent or consistency may not be assured. If not aborted, the PITC may be marked to indicate that it is incomplete.

56 Claims, 2 Drawing Sheets

SYSTEM AND METHOD FOR FACILITATING A CONSISTENT POINT-IN TIME COPY

BACKGROUND

This invention relates to the field of computer systems. More particularly, a system and methods are provided for facilitating a consistent point-in-time copy of one or more electronic files.

The advent of point-in-time copy functions has given file servers, data servers and other entities that manage stored data the ability to take snapshot copies of their data as of a specified time. During a point-in-time copy, a dataset is momentarily frozen (i.e., to prevent updates) and the locations of data in the dataset are rapidly captured. After the point-in-time copy is made, the dataset is thawed and made live again, while the point-in-time copy can be used as desired (e.g., to make a backup of the dataset).

More particularly, during a point-in-time copy operation for one or more files on a disk drive or disk drive array, a snapshot is taken of the metadata or index information identifying all disk blocks in the dataset. After the snapshot is taken, regular activity using the dataset can resume. To preserve the dataset as of the time of the point-in-time copy, when a disk block in the dataset is to be updated after the point-in-time copy, its contents are copied to a new block, and the new block replaces the old block in the live version of the dataset. Thus, disk blocks in the dataset as of the time of the point-in-time copy are preserved.

However, in today's computing environments, existing communication protocols do not allow for coordination of a point-in-time copy between the storage node or entity performing the copy (e.g., a disk array, a server) and the computer(s) or other devices currently accessing the dataset (e.g., client computers, other servers). Thus, it is highly probable that the point-in-time copy will be inconsistent—that it will not capture the true state of the dataset because one or more of the other devices will have data that should be included in the copy.

Thus, what is needed is a system and method for facilitating a consistent point-in-time copy of a specified dataset, so that the point-in-time copy will accurately reflect the state of the dataset at the time of the copy.

SUMMARY

In one embodiment of the invention, a system and method are provided for facilitating a consistent point-in-time copy (PITC). In this embodiment, a data provider provides access to one or more datasets to one or more clients. The data provider recognizes a need for a PITC, possibly from a PITC request received from a client. The data provider then instructs one or more clients (e.g., clients having one of the datasets open) and/or servers to flush any pending updates involving the files.

The instructed clients and servers acknowledge the flush request, flush their data, and notify the data provider when their flushes are complete. The data provider may acknowledge a flush completion, or the sender of flush completion message may continue sending a completion message until it is acknowledged.

Any post-consistency updates—updates received at a client after a specified or default consistency point—are deferred (e.g., using a write-aside buffer). If a client fails to acknowledge the flush request or notify of flush completion, the data provider may abort the PITC, continue or eventually timeout. If not aborted, the PITC may be marked to indicate that it is incomplete.

In one embodiment of the invention, the data provider may stave off a client timeout if that client is showing some sign of progressing toward a consistency point, such as continuing to flush data to the data provider.

DETAILED DESCRIPTION

Figure 1:
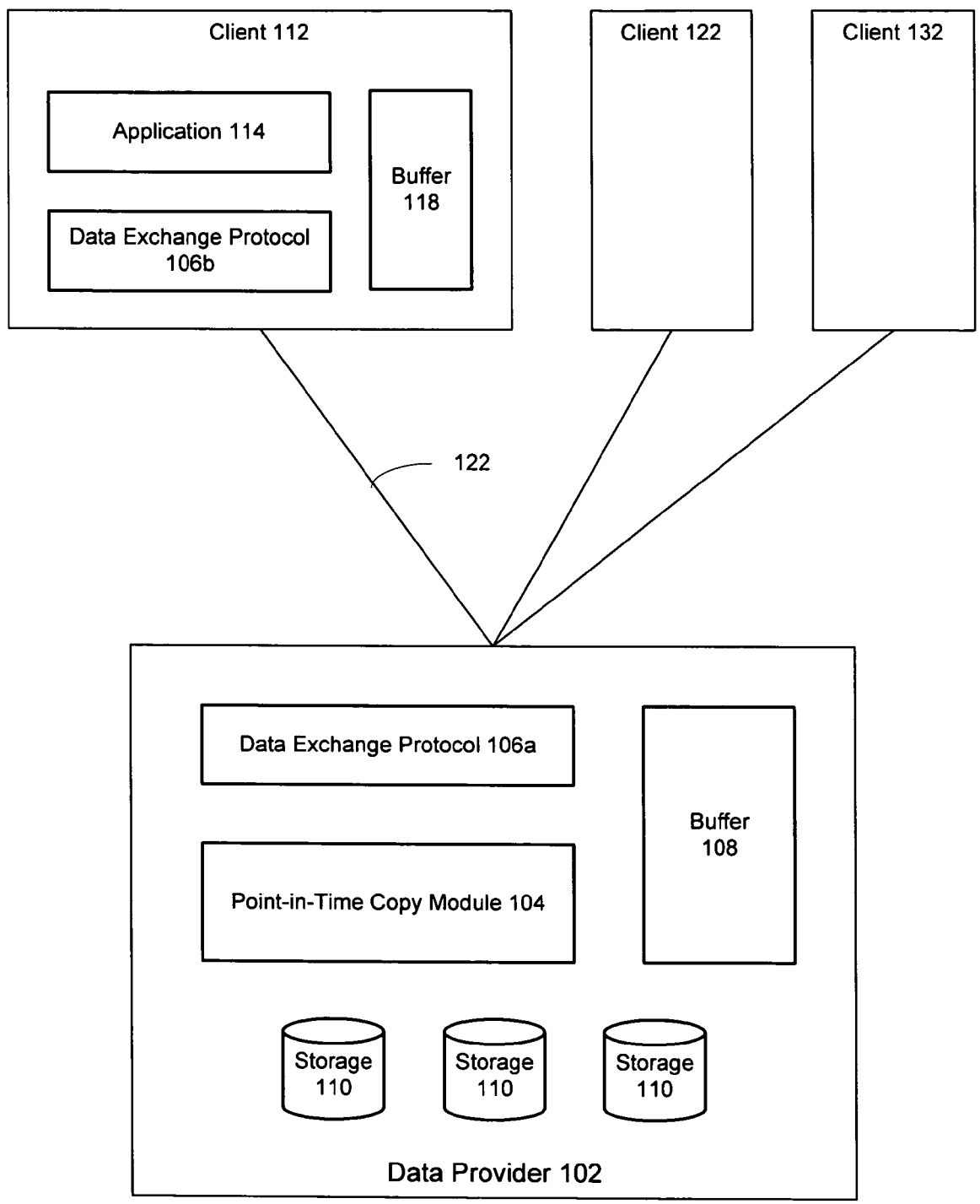
FIG. 1 is a block diagram depicting a system for facilitating a consistent point-in-time copy, in accordance with one embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. It also includes a storage apparatus (e.g., a disk drive, a disk array). Details of such devices (e.g., processor, memory, data storage devices, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for facilitating a consistent point-in-time copy (PITC) of a selected dataset. More particularly, in this embodiment a communication protocol (e.g., a data exchange protocol) permits clients (or other computing devices), servers and data providers (or other devices configured to store or provide access to a set of data) to communicate and exchange information regarding the content and state of a dataset. For example, a client and a data provider can coordinate via a data exchange protocol to ensure that a consistent version of the data set is assembled for a PITC. The dataset may comprise any logical or physical set of data (e.g., blocks, files, records, database tables, disk drives).

One or more embodiments of the invention are described herein as they may be implemented in a file or object sharing network environment. Other embodiments of the invention may be derived for other environments (e.g., a standalone computer system having a local storage device) and other level of data granularity (e.g., blocks, bytes).

FIG. 1 depicts a computing environment in which an embodiment of the invention may be implemented. In this illustrative environment, data provider 102 is a NAS (Network Attached Storage) server, a disk controller or other entity configured to provide data to clients. Data provider 102 includes multiple storage devices (e.g., disk drives) 110, which may be operated as a RAID (Redundant Array of Independent Devices), another type of storage array, or as independent devices.

Clients, including clients 112, 122, 132, may be workstations, laptops, desktops, hand-held devices, other data consumers, or some other computing devices configured to execute application 114, which accesses data stored on data provider 102. Communication link 122 may comprise any number of physical links, which may be wired or wireless, dedicated (e.g., a dial-up link) or shared (e.g., the Internet or other network).

Data provider 102 operates point-in-time copy (PITC) module 104 for making a point-in-time copy of all or any portion of the contents of devices 110. Data provider 102 also operates provider version 106a of data exchange protocol 106 for exchanging files with client 112. Data exchange protocol 106 may handle data at any granularity (e.g., bytes, blocks, files), and therefore may comprise a protocol such as SCSI (Small Computer System Interface), ATA (Advanced Technology Attachment), NFS (Network File System), CIFS (Common Internet File System or Common Internet File Services), etc.

The data provider also includes buffer 108 (e.g., a write-aside buffer) for temporary storage of data. As described below, buffer 108 may be used to temporarily store updates to the dataset while a PITC is pending.

Data provider 102 may comprise one instance of a service running on multiple computer systems within a network, to allow data sharing across the network. In particular, PITC module 104 may be just one instance of a PITC service cooperating with peer data providers or servers.

Each client includes buffer 118 and operates client version 106b of data exchange protocol 106. In addition to the protocols identified above, other file sharing protocols that may be implemented in this embodiment of the invention include IPX (Internetwork Packet eXchange) by Novell, Inc., AFP (Apple File Protocol) by Apple Computer, Inc., and so on.

In other embodiments of the invention, data provider 102, clients, and communication link 122 may be configured differently from the illustrated embodiment. Such other embodiments are similar to the embodiment of FIG. 1 in that the data provider is capable of performing a PITC and the data provider and client exchange data via a data sharing protocol (not necessarily a file sharing protocol) that can be adapted as described herein to promote data consistency for the PITC.

A client that issues a PITC request to data provider 102 is considered the issuing client for the operation. Illustratively, a client's PITC request may identify a specific set of data to be copied, a consistency point, how to handle a communication failure between a client and the data provider during the PITC (e.g., to avoid timing out), etc.

A consistency point indicates when the selected set of data should be made consistent. The consistency point may be specified as a date, a time, an event, a client state or status, or anything else that can be mutually understood by a client.

Embodiments of the invention described herein may employ dates or times as consistency points, but these embodiments do not limit the scope of the invention. If no specific consistency point is identified or requested, a default consistency point may be selected (e.g., the date or time at which the data provider requests a client to flush pending updates to a dataset).

Figure 2:
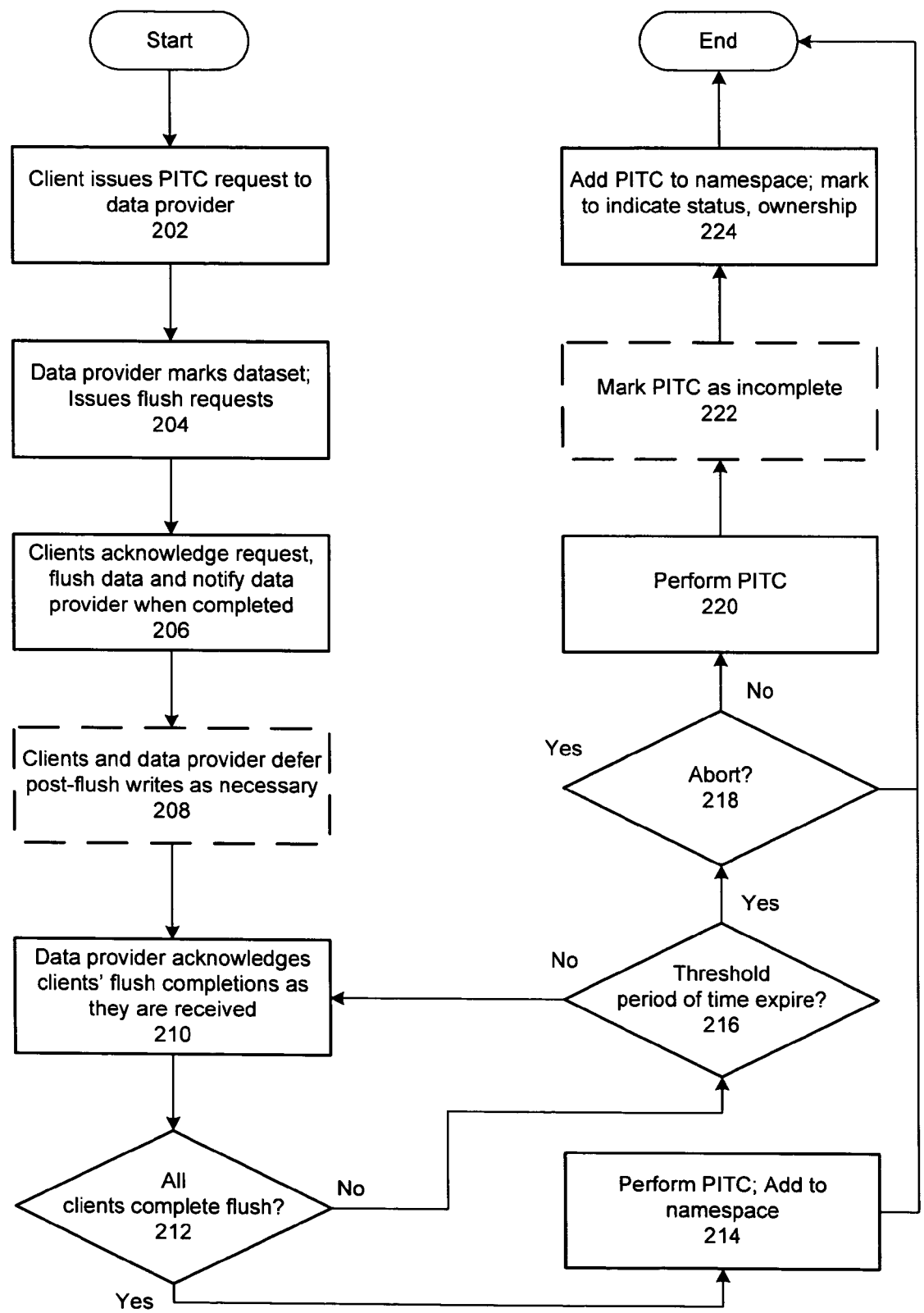
FIG. 2 is a flowchart illustrating one method of facilitating a consistent point-in-time copy, in accordance with an embodiment of the invention.

FIG. 2 demonstrates a method of facilitating a consistent point-in-time copy, according to one embodiment of the invention. In this embodiment, a PITC is initiated by a client or user device, and the clients, servers and the data provider that performs the PITC share data via a file sharing protocol. In other embodiments, a PITC may be initiated by a server, a peer data provider or similar entity, and data may be shared at a file, object, block or other level. Virtually any method or scheme for actually performing a PITC may be performed after the method of FIG. 2.

In operation 202, a client issues a PITC request to a data provider. The data provider stores, or manages the storage of, one or more files. For example, the data provider may be one of several machines that manage access to the files. Or, the data provider may be the only machine that provides access to the files.

In this embodiment of the invention, the request identifies the dataset on which the PITC is to be performed. The dataset may comprise any number of files and/or other data objects. In this embodiment, the request may also identify or indicate what is to be done if the copy fails. Different actions may be indicated or requested for different types of failures, as described below. Or, default behavior may apply in the event of a failure.

In operation 204, the data provider receives the PITC request, marks or flags the dataset elements (e.g., files, objects, devices on which the dataset is stored) as having a pending PITC, and then issues requests to one or more clients, possibly including the client that issued the request, and perhaps one or more servers or peer data providers, to flush any data pending for the dataset. For purposes of describing this embodiment of the invention, any entity that accesses data on the data provider may be considered a client, including servers, peer data providers and data provider itself.

If a specific consistency point is requested by the issuing client or selected by the data provider, then the data provider's flush request message will specify the consistency point, and clients will flush data modified up to and including that point.

In this embodiment, the data provider sends flush requests to those clients that are known or suspected of having data to flush (e.g., those clients that currently have open a file in the dataset). Alternatively, the data provider may issue a broadcast message to all clients or a large number of clients.

In operation 206, clients acknowledge the flush request, send updates to the dataset that were pending as of the consistency point or (if no consistency point is specified) the time they acknowledged the flush request, and then notify the data provider when flushing is complete. Illustratively, even if a client has no data to flush, if it receives a flush request it will acknowledge the request; it may then notify the data provider that it has no data to flush.

Even though a client's data flush may be completed after a selected consistency point, in the illustrated embodiment of the invention the flushed data includes only data updates or modifications submitted before the consistency point. Therefore, when a client notifies the data provider that all data has been flushed, the client and the PITC are considered consistent as of the selected consistency point.

In operation 208, one or more clients may have to accommodate updates (e.g., writes) to the dataset that are received after the request to flush data is received from the data provider, or after a specified consistency point. Such updates must be retained or suspended, in semantic order, until the PITC is completed, aborted or the data provider signals that it can receive them. Illustratively, a client write-aside buffer may be used to store post-consistency point updates until the data provider is ready to accept them.

In one alternative embodiment, once the client completes its data flush (and notifies the data provider), it may forward updates to the data provider—including any updates that were buffered. As described below, the data provider may defer (e.g., buffer) updates that it generates or receives while a PITC is pending, until after the PITC is executed.

In operation 210, the data provider acknowledges clients' completions of their data flush operations, as their completion messages or requests are received. In this embodiment, a client will continue issuing a completion message until an acknowledgement is received.

In operation 212, the data provider determines whether all clients that were requested to flush their data for the dataset have acknowledged the request and flushed the data. If so, the method continues with operation 214; otherwise, the method advances to operation 216.

In the illustrated embodiment of the invention, after the consistency point it specified when requesting data flushes, the data provider preserves the status of the dataset by deferring later writes. For example, a write-aside buffer may be used to store writes received after the consistency point. In this example, the buffer is used to maintain the current, real-time, status of the dataset, while the dataset files will contain the status of the dataset as of the consistency point of the first responding client. Data flushed by other clients that were requested to flush their data are written to the dataset. Read operations may be conducted against the buffer. When the last flush acknowledgement is received (assuming acknowledgements are received from all clients), the dataset is considered consistent.

In operation 214, the dataset is consistent, and so the data provider can flush pre-consistency dataset data from its own memory, if there is any, and execute the point-in-time copy. One skilled in the art will appreciate that any of multiple methods of actually performing a PITC may be applied. When the point-in-time copy is complete, the "pending" flag that was set during operation 204 is removed.

The copy is then added to the data provider's namespace in an appropriate manner. For example, the name of the dataset or the names of files in the dataset may be modified or adjusted, or a new virtual device may be created.

After the PITC is made, pending updates (e.g., post-consistency updates placed in a client or data provider write-aside buffer) can be rolled into the main image of the dataset, and the dataset can be released for normal operations. Notification to clients that the PITC has been completed may be in the form of a simple status message, or may be more elaborate and include a callback procedure for handling errors, for example. After operation 214, the method ends.

In operation 216, the data provider has not received acknowledgements of the flush request and notification of flush completions from all clients that were requested to flush their data. In other words, at least one client failed to acknowledge the flush request or failed to notify the data provider that it had completed flushing its pending data. In this embodiment of the invention, the data provider initiates a timer when the flush request is issued, and checks whether the timer has expired. If a threshold period of time has elapsed from the time the flush request was issued, the illustrated method continues with operation 218; otherwise, it returns to operation 210.

In operation 218, a threshold period of time has expired, and one or more clients may not be consistent with regard to the dataset, and so the data provider determines whether it should abort the PITC. In the illustrated method, the PITC request specifies how the data provider is to behave if not all clients acknowledge the flush request and complete their flushes. Thus, a PITC request may specify a timeout value to apply while awaiting client data flushes. Separate timeout values may be given for clients to acknowledge the flush request and for completing a data flush after their acknowledgements.

Illustratively, the data provider may be instructed to automatically abort the PITC if a timeout period expires. If so, the method ends. Or, as one alternative, the data provider may attempt to complete the operation as best it can, in which case the illustrated method continues at operation 220.

In another embodiment of the invention, expiration of a timeout period may only cause the PITC to be aborted if the offending client is not clearly progressing toward consistency. For example, if the client acknowledged the flush request and is continuing to flush data to the data provider after the timeout period expires, the timeout period may be extended (and continue to be extended).

In operation 220, the data provider flushes pre-consistency dataset data from its memory and executes the point-in-time copy using whatever data it has received from the clients that have completed their flushes. When the point-in-time copy is complete, the "pending" flag that was set during operation 204 is removed.

In operation 222, the copy may be marked as incomplete (e.g., if the PITC request indicated such behavior should be applied).

In operation 224, the PITC is then added to the data provider's namespace in an appropriate manner. For example, the names of files in the dataset may be modified or adjusted, or a new virtual device may be created. Also, the PITC may be marked to indicate its status, such as the contents of the PITC, their origin, the owner of the PITC, etc.

And, pending updates (e.g., post-consistency point updates placed in a write-aside buffer) can be rolled into the main image of the dataset and the dataset can be released for normal operations. After the PITC is completed, the data provider responds to the issuing client (e.g., to inform it of the status of the PITC) and notifies the other clients of the completion, and the method ends.

In another embodiment of the invention, a data provider or server initiates a PITC, or recognizes a need for a PITC, without a request from a client. If the data provider is the only entity through which the target dataset of the PITC can be accessed, then the data provider can facilitate a consistent point-in-time copy by applying operations 204 through 224 of FIG. 2.

The manner in which a client flushes data to the data provider (to achieve consistency) is not tied to a specific protocol or communication scheme. Thus, different data exchange protocols may be employed for different clients and for different embodiments of the invention.

For example, a client communicating with the data provider via the SCSI protocol may execute flushes as simple Write commands in order to minimize disruption to their communication scheme. As a result, however, the data provider cannot easily distinguish between a data flush operation and a regular update. In this situation, the data provider may assume that all updates it receives after the client acknowledges a flush request, and until the client sends a flush completion message, are flush operations.

As another example, a client may employ explicit data flush commands that are readily distinguishable from normal write or update requests. In this situation, the data provider may continue to accept writes while the client is also flushing its data, and apply the writes to its write-aside buffer while the flushes are applied to the dataset.

In one alternative embodiment of the invention, a client is permitted to continue with normal write operations to the target dataset of a point-in-time copy, even while the client is flushing pending updates to the dataset. In this embodiment, the client tags post-consistency point updates (e.g., with a tag supplied by the data provider). The client can therefore flush both pre- and post-consistency modifications to the data provider. The data provider will screen out (e.g., and buffer) the tagged updates. The client may continue to use the tag on all updates for a period of time (e.g., until the PITC is completed or rolled back), until the next PITC requires the use of a different tag, etc.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of facilitating a consistent point-in-time copy of a set of data, the method comprising:
   receiving from an issuing client a request to perform a point-in-time copy of a specified dataset;
   requesting a set of clients, including the issuing client, to flush updates to the dataset that were pending as of a specified consistency point, wherein flushing updates involves each client in the set of clients returning any updates for files or other data objects that were outstanding prior to the consistency point in response to the request;
   receiving from a first client a first notification that the flushing of pending updates has been completed;
   deferring one or more updates to the dataset that were generated after said consistency point; and
   if notifications of completion of the flushing of pending updates are not received from each client in the set of clients within a threshold period of time, determining whether to abort the point-in-time copy, wherein determining whether to abort the point-in-time copy involves continuing with the point-in-time copy if each client from which a notification is not received within the threshold period of time is determined to be progressing toward consistency by flushing pending updates.

2. The method of claim 1, further comprising:
   receiving from the first client a first acknowledgement of the request to flush pending updates to the dataset.

3. The method of claim 1, wherein the request to perform a point-in-time copy indicates behavior to be applied if one or more clients fail to send notifications of completion of the flushing of pending updates to the dataset.

4. The method of claim 1, wherein the request to perform a point-in-time copy indicates behavior to be applied if one or more clients fail to acknowledge the request to flush pending updates to the dataset.

5. The method of claim 1, wherein the request to perform a point-in-time copy identifies the specified consistency point.

6. The method of claim 5, wherein the specified consistency point is specified by the issuing client.

7. The method of claim 5, wherein the specified consistency point is selected by a data provider that receives said request to perform a point-in-time copy.

8. The method of claim 1, wherein the set of clients includes some or all clients that have the dataset open at the time of the request to perform a point-in-time copy.

9. The method of claim 1, wherein said deferring comprises, at a client:
   receiving an update to the dataset after the specified consistency point; and
   storing said update until notification of completion of the flushing of pending updates is sent.

10. The method of claim 1, wherein said deferring comprises, at a data provider configured to receive the request to perform a point-in-time copy:
    receiving an update to the dataset after said first notification from the first client is received; and
    storing said update until the point-in-time copy is performed, wherein storing said update involves storing said update in a write-aside buffer in the data provider for those updates received after receiving a request for a point-in-time copy, wherein performing the point-in-time-copy involves conducting read operations against the write-aside buffer in the data provider.

11. The method of claim 1, wherein the point-in-time copy is performed by a service operating on multiple data providers providing access to the dataset by the set of clients.

12. The method of claim 1, further comprising acknowledging said first notification.

13. The method of claim 1, further comprising:
    providing a tag associated with the point-in-time copy to the set of clients, wherein a client can use the tag when tagging post-consistency point updates to be written back, so that the respective client can continue with updates to the point-in-time copy while the respective client is flushing pending updates.

14. A computer readable device storing instructions that, when executed by a computer, cause the computer to perform a method of facilitating a consistent point-in-time copy of a set of data, the method comprising:
    receiving from an issuing client a request to perform a point-in-time copy of a specified dataset;
    requesting the set of clients, including the issuing client, to flush updates to the dataset that were pending as of a specified consistency point, wherein flushing updates involves each client in the set of clients returning any updates for files or other data objects that were outstanding prior to the consistency point in response to the request;
    receiving from a first client a first notification that the flushing of pending updates has been completed;
    deferring one or more updates to the dataset that were generated after said consistency point; and
    if notifications of completion of the flushing of pending updates are not received from each client in the set of clients within a threshold period of time, determining whether to abort the point-in-time copy, wherein determining whether to abort the point-in-time copy involves continuing with the point-in-time copy if each client from which a notification is not received within the threshold period of time is determined to be progressing toward consistency by flushing pending updates.

15. A computer-implemented method of facilitating a consistent point-in-time copy, the method comprising:
    receiving from a computing device a request to create a point-in-time copy of a set of data objects;

issuing a request for pending updates to the set of data objects to be flushed, wherein issuing the request involves requesting a set of clients to flush updates to the dataset that were pending as of a specified consistency point, wherein flushing updates involves each client in the set of clients returning any updates for files or other data objects that were outstanding prior to the consistency point in response to the request;

receiving one or more acknowledgements of the request for pending updates;

if any pending updates were flushed, receiving one or more notifications of the completion of flushing of the pending updates; and determining whether the set of data objects is consistent with respect to all computing devices to which the request to flush pending updates was sent, wherein determining whether the set of data objects is consistent involves determining if each computing device from which a notification of completion is not received within a threshold period of time is progressing toward consistency by flushing pending updates and, if so, continuing with the point-in-time copy for the computing device.

16. The method of claim 15, wherein said receiving one or more acknowledgements comprises:
receiving acknowledgements from a subset of the computing devices to which the request to flush pending updates was sent.

17. The method of claim 15, wherein said receiving one or more notifications comprises:
receiving notifications from a subset of the computing devices to which the request to flush pending updates was sent.

18. The method of claim 15, further comprising, at a first computing device:
receiving an update to a first data object in the set of data objects after sending acknowledgement of the request to flush pending updates; and
deferring said update.

19. The method of claim 15, further comprising, at a data provider that received the request to create a point-in-time copy:
receiving an update to a first data object in the set of data objects after receiving said notification; and
deferring said update, wherein deferring said update involves storing said update in a write-aside buffer in the data provider for those updates received after receiving a request for a point-in-time copy, wherein performing the point-in-time-copy involves conducting read operations against the write-aside buffer in the data provider.

20. The method of claim 15, wherein said determining comprises:
determining whether all computing devices to which the request to flush pending updates was sent have acknowledged the request to flush pending updates.

21. The method of claim 15, wherein said determining comprises:
determining whether all computing devices to which the request to flush pending updates was sent have sent notification that any pending updates have been flushed.

22. The method of claim 15, wherein the set of data objects is considered consistent with respect to all computing devices to which the request to flush pending updates was sent if the computing devices have sent notifications that any pending updates have been flushed.

23. The method of claim 15, wherein the set of data objects comprises a file stored in a single location.

24. The method of claim 15, wherein the set of data objects comprises a file shared among multiple storage locations.

25. A computer readable device storing instructions that, when executed by a computer, cause the computer to perform a method of facilitating a consistent point-in-time copy, the method comprising:
receiving from a computing device a request to create a point-in-time copy of a set of data objects;
issuing a request for pending updates to the set of data objects to be flushed, wherein issuing the request involves requesting a set of clients to flush updates to the dataset that were pending as of a specified consistency point, wherein flushing updates involves each client in the set of clients returning any updates for files or other data objects that were outstanding prior to the consistency point in response to the request;
receiving one or more acknowledgements of the request for pending updates;
if any pending updates were flushed, receiving one or more notifications of the completion of flushing of the pending updates; and
determining whether the set of data objects is consistent with respect to all computing devices to which the request to flush pending updates was sent, wherein determining whether the set of data objects is consistent involves determining if each client in the set of clients from which a notification of completion is not received within a threshold period of time is progressing toward consistency by flushing pending updates and, if so, continuing with the point-in-time copy for the client.

26. A computer-implemented method of facilitating a consistent point-in-time copy of a set of data, the method comprising:
issuing a first request for a point-in-time copy of a specified dataset;
receiving a second request to flush any updates to the dataset that are pending, wherein receiving the second request involves receiving a request from a data provider to flush updates to the dataset that were pending as of a specified consistency point, wherein the data provider is configured to store or process data for one or more clients, wherein flushing updates involves returning any updates for files or other data objects that were outstanding prior to the consistency point in response to the second request;
flushing any said pending updates to the dataset, wherein flushing any said pending updates to the dataset involves continuing to flush any said pending updates after a threshold period of time indicating an original end time of the point-in-time copy if, by flushing the pending updates after the threshold period of time, progress continues to be made toward consistency; and
sending notification that said flushing is complete.

27. The method of claim 26, further comprising:
acknowledging the second request.

28. The method of claim 27, further comprising:
receiving an update to the dataset after acknowledging said second request; and
deferring said update.

29. The method of claim 26, wherein said first request for a point-in-time copy is configured to:
identify the dataset; and
indicate action to take if not all computing devices having pending updates to the dataset send notification that said flushing is complete.

30. The method of claim 29, wherein said request for a point-in-time copy is further configured to:

indicate action to take if not all computing devices to which the second request is sent acknowledge the second request.

31. The method of claim 29, wherein said request for a point-in-time copy is further configured to:
identify the specified consistency point.

32. A computer readable device storing instructions that, when executed by a computer, cause the computer to perform a method of facilitating a consistent point-in-time copy of a set of data, the method comprising:
issuing a first request for a point-in-time copy of a specified dataset;
receiving a second request to flush any updates to the dataset that are pending, wherein receiving the second request involves receiving a request from a data provider to flush updates to the dataset that were pending as of a specified consistency point, wherein the data provider is configured to store or process data for one or more clients, wherein flushing updates involves returning any updates for files or other data objects that were outstanding prior to the consistency point in response to the second request;
flushing any said pending updates to the dataset, wherein flushing any said pending updates to the dataset involves continuing to flush any said pending updates after a threshold period of time indicating an original end time of the point-in-time copy if, by flushing said pending updates after the threshold period of time, progress continues to be made toward consistency; and
sending notification that said flushing is complete.

33. An automated method of facilitating a consistent point-in-time copy of a set of data, the method comprising:
issuing a request to a set of client computing devices to flush pending updates to the set of data, wherein flushing updates involves each client computing device in the set of client computing devices returning any updates for files or other data objects that were outstanding prior to the consistency point in response to the request;
receiving notification from a first subset of the client computing devices that pending updates to the set of data have been flushed; and
determining whether the set of data is consistent with regard to the set of client computing devices, wherein determining whether the set of data is consistent involves determining if each client computing device from which a notification is not received within a threshold period of time is progressing toward consistency by flushing pending updates and, if so, continuing with the point-in-time copy for the client computing device.

34. The method of claim 33, further comprising:
determining whether to abort the point-in-time copy; and
determining whether to mark the point-in-time copy as incomplete.

35. The method of claim 33, further comprising:
receiving acknowledgement of the request from a second subset of the client computing devices.

36. The method of claim 33, further comprising:
receiving an update to the set of data after a first notification is received from a first client; and
deferring the update.

37. A network of computer systems configured to facilitate a consistent point-in-time copy of a set of data, comprising:
a data provider configured to provide access to the set of data by a client;
a set of clients configured to access the set of data through said data provider; and
a data exchange protocol executing on said data provider and said clients, wherein said data exchange protocol is configured to:
convey a request, from the data provider to the set of clients, to flush pending updates to the set of data, wherein flushing updates involves each client in the set of clients returning any updates for files or other data objects that were outstanding prior to the consistency point in response to the request; and
convey a notification, from a client to the data provider, that the client has completed flushing updates to the set of data, wherein conveying the notification involves first flushing any said pending updates to the dataset, wherein flushing any said pending updates to the dataset involves continuing to flush any said pending updates after a threshold period of time indicating an original end time of the point-in-time copy if, by flushing said pending updates after the threshold period of time, progress continues to be made toward consistency.

38. The network of claim 37, further comprising:
a first client in the set of clients, wherein the first client is configured to issue a request for a point-in-time copy of the set of data.

39. The network of claim 37, wherein said data exchange protocol is further configured to convey acknowledgement of the request from the client to the data provider.

40. The network of claim 37, wherein the data provider comprises:
a point-in-time copy module configured to initiate a point-in-time copy of the set of data.

41. The network of claim 40, wherein the data provider further comprises:
a memory configured to store an update to the set of data received after a first notification is received from a first client that the first client has completed flushing updates to the set of data.

42. The network of claim 37, wherein a first client comprises:
an application configured to access the set of data; and
a memory configured to store an update to the set of data generated by the application after the first client acknowledges said request to flush pending updates to the set of data.

43. A client computing device for facilitating a consistent point-in-time copy of a set of data, the device comprising:
an application configured to generate updates to the set of data; and
a data exchange protocol configured to enable data sharing between the client computing device and a data provider;
wherein the client computing device is configured to flush updates to the set of data in response to a flush request from the data provider, wherein flushing updates returning any updates for files or other data objects that were outstanding prior to the consistency point in response to the request; and
wherein the client computing device is further configured to notify the data provider when the flushing of said updates to the set of data is completed, wherein notifying the data provider involves first flushing any said pending updates to the dataset, wherein flushing any said pending updates to the dataset involves continuing to flush any said pending updates after a threshold period of time indicating an original end time of the point-in-time copy if, by flushing said pending updates after the threshold period of time, progress continues to be made toward consistency.

44. The client computing device of claim 43, wherein the client computing device is further configured to issue a request to the data provider to perform the point-in-time copy of the set of data.

45. The client computing device of claim 44, wherein said request to perform the point-in-time copy specifies a consistency point.

46. The client computing device of claim 44, wherein said request to perform the point-in-time copy specifies how the data provider should respond if a period for responding to the flush request expires before the client computing device notifies the data provider of completion of the flushing of said updates.

47. The client computing device of claim 43, wherein the client computing device is further configured to acknowledge said flush request.

48. The client computing device of claim 47, wherein the client computing device is further configured to defer an update to the set of data received from the application after said flush request is acknowledged.

49. A computer system configured to facilitate a consistent point-in-time copy of a dataset, comprising:
- a point-in-time copy module configured to perform a point-in-time copy of a specified dataset;
- a data exchange protocol configured to enable data sharing between the computer system and one or more client devices configured to access the dataset;
- wherein the computer system is configured to request the client devices to flush any pending updates to the dataset, wherein flushing updates involves each client returning any updates for files or other data objects that were outstanding prior to the consistency point in response to the request; and
- wherein the computer system is further configured to determine whether the dataset is consistent in relation to the client devices, wherein determining whether the dataset is consistent involves determining if each client device has completed flushing said pending updates before a threshold period of time and, if not, continuing with the point-in-time copy while one or more of the client devices is progressing toward consistency by flushing pending updates.

50. The computer system of claim 49, wherein the computer system is further configured to receive a request for the point-in-time copy from one of the client devices.

51. The computer system of claim 49, wherein the computer system is further configured to receive an acknowledgement of said request to flush pending updates from a client device.

52. The computer system of claim 49, wherein the computer system is further configured to receive notification from a client device that the client device has completed flushing updates to the set of data that were pending on the client device.

53. The computer system of claim 52, wherein the computer system is further configured to acknowledge said notification.

54. The computer system of claim 49, wherein the dataset is considered consistent in relation to the client devices if each client device notifies the computer system that the client device has completed flushing updates to the set of data that were pending on the client device.

55. The computer system of claim 49, wherein the dataset is considered inconsistent in relation to the client devices if one or more client devices fail to notify the computer system, within a threshold period of time, that the client device has completed flushing updates to the set of data that were pending on the client device.

56. The computer system of claim 49, wherein the dataset is considered inconsistent in relation to the client devices if one or more client devices fail to acknowledge request to flush pending updates to the dataset within a threshold period of time.

* * * * *

UNITED STATES PATENT AND TRADEMARK OFFICE
CERTIFICATE OF CORRECTION

PATENT NO. : 7,739,352 B2  
APPLICATION NO. : 10/831096  
DATED : June 15, 2010  
INVENTOR(S) : Brian L. Wong et al.

Page 1 of 1

It is certified that error appears in the above-identified patent and that said Letters Patent is hereby corrected as shown below:

On the Title page Item (54) in "Title", line 2, delete "POINT-IN TIME" and insert -- POINT-IN-TIME --, therefor.

In column 1, line 2, delete "POINT-IN TIME" and insert -- POINT-IN-TIME --, therefor.

In column 8, line 22-23, in claim 10, delete "point-in-time-copy" and insert -- point-in-time copy --, therefor.

In column 9, line 49, in claim 19, delete "point-in-time-copy" and insert -- point-in-time copy --, therefor.

In column 9, line 59, in claim 21, after "sent" delete "have sent".

Signed and Sealed this  
Ninth Day of August, 2011

David J. Kappos  
*Director of the United States Patent and Trademark Office*